United States Patent [19]

Appolonia et al.

[11] Patent Number: 5,186,008

[45] Date of Patent: Feb. 16, 1993

[54] CRYOGENIC FREEZER APPARATUS AND METHOD

[75] Inventors: Jack Appolonia, Yardley, Pa.; Clair Wheeler, Basking Ridge; Akhilesh Kapoor, Clark, both of N.J.

[73] Assignee: The BOC Group, Inc., New Providence, N.J.

[21] Appl. No.: 798,307

[22] Filed: Nov. 25, 1991

[51] Int. Cl.⁵ .......................................... F25D 13/06
[52] U.S. Cl. ........................................ 62/63; 62/266; 62/374; 62/380
[58] Field of Search ................ 62/266, 380, 381, 274, 62/63

[56] References Cited

U.S. PATENT DOCUMENTS

| | | | |
|---|---|---|---|
| 3,728,869 | 4/1973 | Schmidt | 62/266 |
| 4,056,950 | 11/1977 | Kaufman, Jr. | 62/381 |
| 4,078,394 | 3/1978 | Chamberlain et al. | 62/381 |
| 4,276,753 | 7/1981 | Sandberg et al. | 62/380 |
| 4,528,819 | 6/1985 | Klee | 62/266 |
| 4,813,245 | 3/1989 | Hubert et al. | 62/266 |
| 4,866,946 | 9/1989 | Klee | 62/381 |

Primary Examiner—Ronald C. Capossela

Attorney, Agent, or Firm—David M. Rosenblum; Larry R. Cassett

[57] ABSTRACT

The present invention provides a cryogenic freezer and method using a freezing chamber within which articles are cooled under the direct application of a cryogen, causing the cryogen to vaporize into a cryogenic vapor. The freezing chamber has inlet and outlet plenums through which articles to be frozen are passed into and from the freezing chamber, respectively. The liquid cryogen is introduced from a make-up tank into the freezing chamber and into direct contact with the articles to be frozen. Conduits connect the inlet and outlet plenums to a blower that draws air from outside the freezing chamber and the cryogenic vapor from inside the freezing chamber to prevent air from entering the freezing chamber. The cryogenic vapor is drawn from an outlet in the freezing chamber to a recovery unit to be compressed, purified and liquefied. The resulting liquid cryogen is then fed back to the make-up tank. In order to prevent air from being processed by the recovery unit along with the cryogenic vapor, the cryogenic vapor is drawn from the freezing chamber at a level thereof that is as low as possible and such that the mass flow rate of the cryogenic vapor drawn from the freezing chamber is equal to that of the liquid cryogen upon its entry into the freezing chamber.

13 Claims, 1 Drawing Sheet

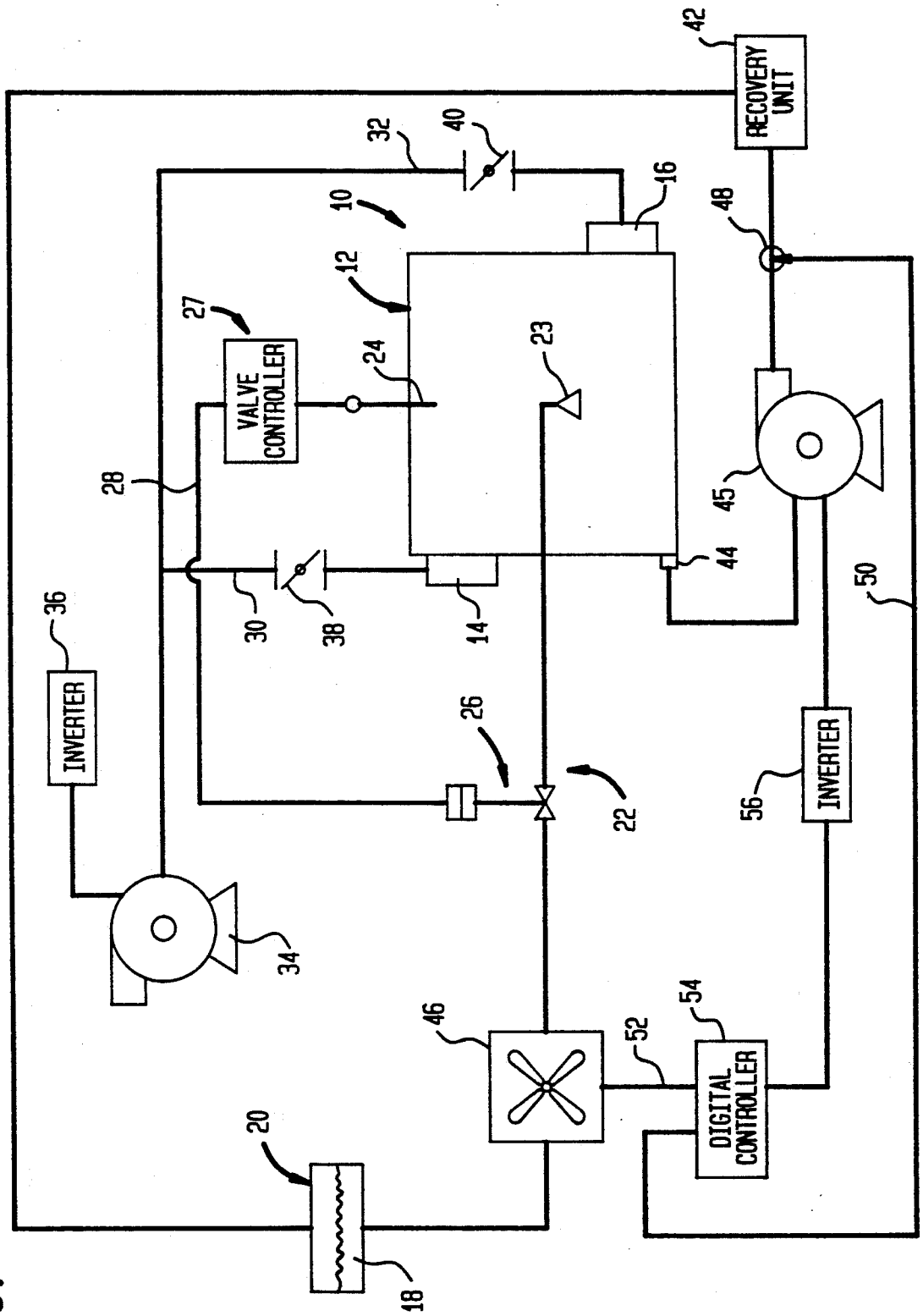

CRYOGENIC FREEZER APPARATUS AND METHOD

BACKGROUND OF THE INVENTION

The present invention relates to a cryogenic freezing apparatus and method in which articles are cooled within a freezing chamber of a cryogenic freezer by application of a cryogen supplied to the freezing chamber as a liquid. More particularly, the present invention relates to such a cryogenic freezing apparatus and method in which the cryogen vaporizes in the course of the freezing of the articles and is thereafter recovered through recompression, purification and liquefaction.

Cryogenic freezers are well known in the art and have principal application to the food processing industry for refrigerating food by either lowering the temperature of the food or by actually freezing the food. Such freezers are also used within industrial processes in which the temperature of articles are lowered in the course of such processes. In such freezers, the articles to be cooled are brought into direct contact with a cryogen and the cryogen vaporizes to form a cryogenic vapor.

Cryogenic spiral belt freezers are very common in the food processing industry. In spiral belt freezers, an endless spiral belt receives the food from an inlet plenum and discharges the food from an outlet plenum. The inlet and outlet plenums can be located at the same or at different levels in which case the spiral belt freezer is termed as either ascending or descending. Within the cryogenic spiral belt freezer, one or more injection nozzles spray liquid cryogen, such as carbon dioxide which immediately expands into carbon dioxide snow, onto the food. The food cools upon contact with the cryogen and the cryogen boils off into a vapor.

As may be appreciated, the cryogenic vapor tends to flow out of the inlet and outlet plenums. Since cryogenic vapor such as carbon dioxide or nitrogen can pose a danger of suffocation, the cryogenic vapor is conventionally expelled from the work area by a blower and suitable conduits. It is to be noted that the expelling of the cryogen vapor is uneconomical as a waste of refrigerant. In order to prevent the cryogen from being wasted, a recovery unit can be employed in conjunction with the cryogenic freezer to purify and then liquefy the cryogenic vapor drawn from the inlet and outlet plenums. After liquefaction, the cryogen can be recycled for use in freezing articles such as food.

The use of a recovery unit within a cryogenic spiral belt freezer is illustrated in U.S. Pat. No. 3,728,869. In this patent, a freezing chamber is provided with enlarged inlet and outlet plenums termed therein as entrance and exit vestibules. The interior of the freezing chamber is kept at a positive pressure and carbon dioxide vapor is drawn at the inlet and outlet vestibules, also at a positive pressure by a recirculating fan. The inlet and outlet vestibules are sufficiently deep such that the dense carbon dioxide filling the vestibules produces a barrier that prevents the ingress of air into the freezing chamber. The carbon dioxide vapor drawn from the inlet and outlet vestibules can be recirculated back to the freezing chamber after being reliquefied.

Another example of the use of a recovery unit used in conjunction with a cryogenic freezer is shown in U.S. Pat. No. 4,952,223, the specification and drawings of which are hereby incorporated by reference. The recovery unit illustrated in this patent is designed to recompress, purify and liquefy carbon dioxide vapor obtained from a carbon dioxide freezer and to recycle the resultant liquid carbon dioxide back to the freezer. Unlike the examples given above, carbon dioxide vapor is recovered from the top of a freezer along with air present within the freezer. In fact, air can be injected into the air and carbon dioxide flow drawn from the freezer to assist evacuation of the freezer. Moreover, there is no provision for the prevention of air entry into the freezer. Even so, this patent makes it very clear that the lower the concentration of carbon dioxide present in the feed to be recovered, the lower the recovery rate of the carbon dioxide.

In fact with any recovery unit, it is important that the concentration of air within the air/cryogen mixture being fed to the recovery unit be as low as possible to increase the recovery rate of the cryogen. It goes without saying that the more cryogen lost from the freezing unit, the less cryogen there will be to recover. There are, however, practical problems associated with optimizing the recovery rate of a cryogen after its vaporization within a cryogenic freezer. For instance, conventional spiral belt freezers can not easily be adapted to utilize the disclosure contained within the '869 patent without major redesign. The reason for this is that inlet and outlet plenums of conventional spiral belt cryogenic freezers would not collect a sufficient amount of cryogenic vapor to form an air barrier. Cryogen recovery from the inlet and outlet plenums of conventional cryogenic freezers suffers the same infirmities as the '223 patent because air is drawn along with the cryogenic vapor to the recovery unit.

As will be discussed, the present invention provides a cryogenic freezer employing a cryogenic vapor recovery unit which processes the cryogenic vapor essentially free of air while minimizing loss of the cryogen from the freezer in order to enhance the recovery rate of the cryogen.

SUMMARY OF THE INVENTION invention provides a cryogenic freezer including a freezing chamber within which articles are cooled and a pair of inlet and outlet plenums connected to the freezing chamber. Means are provided for introducing the cryogen as a liquid into the freezing chamber and into direct contact with the articles causing the articles to cool and the cryogen vaporize into a cryogenic vapor having a density greater than air. Recovery means are provided for compressing, purifying and liquefying the cryogenic vapor and for recycling liquid cryogen produced from the liquefaction of the cryogenic vapor back to the cryogen introducing means.

Exhaust means draws the air from outside of the freezing chamber and the cryogenic vapor from inside of the freezing chamber, into and then from, the inlet and outlet plenums for preventing air from entering the freezing chamber and such that the cryogenic vapor is drawn from the freezing chamber at a essentially constant, minimum flow rate. As a result, air concentration within the freezing chamber is prevented from increasing. Additionally, the freezing chamber has an outlet and outlet drawing means for drawing a combined flow of the cryogenic vapor and air present within the freezing chamber through the outlet and to the recovery means at a combined flow rate. The outlet is spaced sufficiently below the top of the freezing chamber such that the air concentration of the combined flow is substantially minimized due to the density of the cryogenic vapor. The dense cryogenic vapor will displace air within the freezing chamber such that the cryogenic vapor is purer at or near the bottom of the freezing chamber than at the top of the freezing chamber. Conditions within the freezing chamber are maintained at a steady state by regulating the combined flow rate such that a total mass flow rate of the cryogenic vapor drawn from the inlet and outlet plenums and from the outlet is essentially equal to a liquid mass flow rate of the cryogen upon its entry into the freezing chamber. As a result of such consistency, over and under pressures within the freezing chamber are not produced that would expel the cryogenic vapor through the inlet and outlet plenums above the essentially constant minimum flow rate, or draw air into the freezing chamber, respectively.

In another aspect, the present invention provides a method of cooling articles within a cryogenic freezer. In accordance with such method, the articles are passed into and from a freezing chamber within which articles are cooled through inlet and outlet plenums connected to the freezing chamber. Cryogen is then introduced as a liquid into the freezing chamber and into direct contact with the articles such that the articles cool and the cryogen vaporizes into a cryogenic vapor having a density greater than air. The cryogen is then recovered from the cryogenic vapor by compressing, liquefying and purifying the cryogenic vapor and then, by introducing the cryogen produced from the liquefaction of the cryogenic vapor back into the freezing chamber to freeze the articles.

Air is prevented from entering the freezing chamber and thereby increasing air concentration within the freezing chamber by drawing the air from outside of the freezing chamber and the cryogenic vapor from inside of the freezing chamber into, and then from the inlet and outlet plenums and such that the cryogen vapor is drawn at an essentially constant minimum flow rate. A combined flow of the cryogenic vapor and the air is drawn from the freezing chamber to the recovery unit at a combined flow rate and from an outlet of the freezing chamber spaced sufficiently below the top of the freezing chamber such that the air concentration within the combined flow, at the outlet due to the density of the cryogenic vapor is essentially at a minimum. The combined flow rate is controlled such that over and under pressures are prevented that would expel cryogenic vapor through the inlet and outlet plenums above the essentially constant minimum flow rate and into the freezing chamber, respectively. This is accomplished by controlling the combined flow rate such that a total mass flow rate of the cryogen vapor drawn through the inlet and outlet plenums and from the outlet is essentially equal to a liquid mass flow rate of the cryogen upon its entry into the freezing chamber.

BRIEF DESCRIPTION OF THE DRAWINGS

While the specification concludes with claims particularly pointing out and distinctly claiming the subject matter that Applicants regard as their invention, it is believed that the invention will be better understood from the sole accompanying FIGURE which is a schematic view of a cryogenic freezer in accordance with the present invention.

DETAILED DESCRIPTION OF THE DRAWINGS

The FIGURE illustrates a cryogenic freezer 10 in accordance with the present invention. Cryogenic freezer 10 includes a freezing chamber 12 having inlet and outlet plenums 14 and 16. Articles, such as food, enter freezing chamber 12 through an inlet plenum 14 serving as the inlet to freezing chamber 12 and pass out of freezing chamber 12 via outlet plenum 16 acting as the outlet to freezing chamber 12. Freezing chamber 12 although not specifically illustrated, is preferably a freezing chamber of a spiral belt freezer in which the articles of food travel within freezing chamber 12 along a descending spiral belt arrangement. Cryogenic freezer 10 is preferably a KF 28-4000 CRS, manufactured by AIRCO CO2 of The BOC Group, Inc., the assignee herein.

The articles are frozen under direct application of a cryogen comprising liquid carbon dioxide 18, stored within a make-up tank 20. In this regard, make-up tank 20 stores approximately 44,000 liters of liquid carbon dioxide under a pressure of approximately 21.7 kg/cm$^2$ absolute at about $-17.8°$ C. Make-up tank 20 is connected at the bottom to freezing chamber 12 via a piping system 22 having one or more injection nozzles 23 to spray the articles with carbon dioxide snow which forms carbon dioxide vapor upon sublimation of liquid carbon dioxide 18. The direct application of the carbon dioxide snow causes the articles to freeze and the carbon dioxide to in turn boil off into a cryogenic vapor.

The feed rate of liquid carbon dioxide 18 into freezing chamber 12 is adjusted to be dependent upon the temperature within freezing chamber 12. In this regard, a temperature sensor 24, well known in the art, is provided to sense the temperature within freezing chamber 12. Piping system 22 is provided with an electrically activated air operated metering valve 26 to control the flow rate of liquid carbon dioxide 18 entering freezing chamber 12 in response to the temperature sensed by temperature sensor 24. Control of metering valve 26 is provided by a valve controller 27, also well known to one skilled in the art. Valve controller 27 is connected to metering valve 26 by an electrical connection 28. A desired temperature for freezing chamber 12 is selected and is preset into valve controller 27. Valve controller 27 in operation compares the temperature sensed by temperature sensor 24 with the preset temperature. In response to the comparison, controller 27 generates signals to either close metering valve 26 to decrease the mass flow rate of liquid carbon dioxide 18 (in the event that the temperature sensed is lower than the preset temperature) or to open metering valve 26 to increase the mass flow rate of liquid carbon dioxide 18 (in the event that the temperature sensed is higher than the preset temperature.)

Air enters freezing chamber 12 and cryogenic vapor escapes from freezing chamber 12 through inlet and outlet plenums 14 and 16. The entering air warms the interior of freezing chamber 12 and thereby causes increased cryogen usage to maintain cold temperatures within freezing chamber 12. Additionally, the greater the concentration of air within freezing chamber 12, the lower will be the recovery rate of the cryogen from the cryogenic vapor. Substantial amounts of air drawn with the cryogenic vapor from freezing chamber 12 will increase the power costs, compressor size and adsorbent size of a recovery system, such as illustrated in U.S. Pat.

No. 4,952,223. It is to be noted that some $CO_2$ will be lost from the system during the purification steps involved in this patent. Such losses when taken with substantial losses of the cryogenic vapor from freezing chamber 12 will decrease the amount of cryogenic vapor to be recovered.

As mentioned above, liquid carbon dioxide 18 is being supplied to freezing chamber 12 at a liquid mass flow rate that can vary with temperature conditions within freezing chamber 12. Although not illustrated, the resultant carbon dioxide snow and vapor is circulated within freezing chamber 12 by provision of fans. Even with such circulation, the dense carbon dioxide vapor collects at the bottom of freezing chamber 12 where it is drawn for recovery. The result of such simultaneous supply and withdrawal of carbon dioxide is that a vertical pressure gradient is produced within freezing chamber 12 which ranges from a subatmospheric pressure at the top of freezing chamber 12 to a pressure greater than atmospheric pressure at the bottom of freezing chamber 12. In accordance with the present invention both air and cryogenic vapor are drawn from inlet plenum 14, the higher of the plenums, at a pressure that is less than the pressure existing at the top of freezing chamber 12. The result is that air is inhibited from entering freezing chamber 12 from inlet plenum 14. Additionally, the flow of cryogen vapor from outlet plenum 16 is markedly reduced. In fact, any excess of cryogenic vapor is drawn at about atmospheric pressure from outlet plenum 16.

The above operation is accomplished by an exhaust system having conduits 30 and 32 connecting inlet and outlet plenums 14 and 16 to a blower 34. Blower 34 acts to draw air from outside of freezing chamber 12 and carbon dioxide vapor from within freezing chamber 12 into inlet plenum 14 and excess cryogenic vapor from outlet plenum 16. The speed of blower 34 is controlled by an inverter 36 to adjust the draw rates in accordance with the amount of cryogenic vapor produced within freezing chamber 12. In order to compensate for the pressure gradient, a greater flow rate of carbon dioxide and air must be drawn at inlet plenum 14 than at outlet plenum 16. To this end, a pair of dampers 38 and 40 are positioned in conduits 30 and 32 to adjust the draw within conduits 30 and 32. Dampers 38 and 40 are set to increase the mass flow rate drawn from conduit 30 and to decrease the mass flow rate drawn from conduit 32. The end result of this is that blower 34 is drawing some carbon dioxide vapor which cannot be recovered. However, since air is inhibited from entering freezing chamber 12, more cryogenic vapor exists within freezing chamber 12 to be recovered. In practice, the adjustment of dampers 38 and 40 can be accomplished manually to produce emerging clouds of carbon dioxide at inlet and outlet plenums 14 and 16.

It is understood that other types of freezing chambers than have been discussed above, have inlet and outlet plenums set at the same level. In such a case, dampers 38 and 40 would not be required. However, both air and cryogenic vapor would have to be drawn through inlet and outlet plenums to prevent entry of air into the freezing chambers. In this regard, in any freezer, cryogenic vapor should be drawn at a minimum mass flow rate, that is at the lowest mass flow rate possible that will minimize the loss of the cryogen while preventing ingress of air into the freezing chamber.

A recovery unit 42 is provided to purify and reliquefy carbon dioxide vapor formed in chamber 12. Recovery unit 42 is designed in accordance with U.S. Pat. No. 4,952,223 and will process air along with the carbon dioxide. However, for reasons discussed previously, the amount of air to be processed should be at a minimum. Preventing air from entering freezing chamber 12 will reduce the air concentration within freezing chamber 12. Some air will however invariably enter freezing chamber 12. Air concentration of the air/cryogenic vapor mixture drawn from freezing chamber 12 can be further reduced by drawing the mixture from below the top of freezing chamber 12. The carbon dioxide vapor being more dense than air will tend to displace the air so that the greater the distance from the top of freezing chamber 12 at which the mixture is drawn for recovery, the lower will be the concentration of air within the mixture.

As illustrated, a blower 45 is connected to an outlet 44 situated at the lowest possible point of freezing chamber 12 to introduce cryogenic vapor into recovery unit 42 for recovery. It is understood that since the freezing chambers of cryogenic freezers are insulated, the lowest point for the cryogenic vapor outlet might be slightly higher than that illustrated. Furthermore, it is also understood that outlet 44 is simply an opening located within freezing chamber 12 connected to blower 44 by conventional piping fittings.

Conditions of minimum air flow into freezing chamber 12 and minimum mass flow of cryogenic vapor from freezing chamber 12 are preserved by maintaining pressure distribution within the freezing chamber essentially constant. Since cryogenic vapor and air are being drawn at essentially constant mass flow rates, over pressures will tend to expel cryogenic vapor from freezing chamber 12 and under pressures will tend to draw air into freezing chamber 12. The maintenance of constant pressure distribution is accomplished regulating the carbon dioxide/air mixture being drawn from outlet 44 such that the mass flow rate of the cryogen upon its entry into freezing chamber 12 will be approximately equal to a sum of the mass flow of cryogenic vapor being drawn from inlet and outlet plenums 14 and 16 and cryogenic vapor being drawn from outlet 44. To this end, a liquid mass flow rate of entering liquid carbon dioxide 18 is sensed by a turbine flow meter 46 and a combined flow rate of the cryogenic vapor and air drawn to recovery unit 42 is sensed by a sensor 48. Preferably, sensor 48 consists of an orifice plate, two pressure sensors upstream and downstream of the orifice plate, and an upstream thermocouple. The foregoing pressure sensors and etc. of sensor 48 and turbine flow meter 46, generate mass flow signals along cable bundle 50 and cable 52, respectively, connected to a controller 54.

Controller 54, which is preferably a digital controller, is programmed in a manner well known in the art to compute or derive from the mass flow signals, the liquid mass flow rate of the entering liquid cryogen and an outlet mass flow rate of the cryogenic vapor contained within the combined flow sensed by sensor 48.

Controller 54 is connected to an inverter 56 which is responsive to a control signal generated by controller 54 to regulate the speed of outlet blower 45. Controller 54 is programmed to generate the control signal as follows: A constant is estimated which represents the proportion of the liquid mass flow of the entering liquid cryogen that is drawn as cryogenic vapor from outlet 44, given the fact that the mass flow of the cryogenic vapor drawn from inlet and outlet plenums 14 and 16 is essentially constant. For cryogenic freezer 10, the constant is estimated as 0.9. In other words, 10% of the liquid mass flow of the entering liquid cryogen will be drawn as cryogen vapor from inlet and outlet plenums 14 and 16, and 90% of the liquid mass flow of the entering cryogen will be drawn as cryogenic vapor from outlet 44. The speed control signal is then generated in a manner well known in the art such that the outlet mass flow rate of the cryogenic vapor drawn from outlet 44 will be equal to a product of the liquid mass flow rate of the entering liquid cryogen sensed by turbine flow meter 66 and the constant. Hence, if the outlet mass flow rate of the cryogenic falls below the product, the control signal acting through inventor 56 will increase the speed of outlet blower 45. Conversely, if the outlet mass flow rate is greater than the product, the control signal will be generated by controller 54 so as to reduce the speed of outlet blower 45.

While a preferred embodiment of the invention has been shown and described in detail, it will be readily understood and appreciated by those skilled in the art, that numerous omissions, changes and additions may be made without departing from the spirit and scope of the invention.

We claim:

1. In a cryogenic freezer including: a freezing chamber within which articles are cooled; a pair of inlet and outlet plenums connected to the freezing chamber; means for introducing the cryogen as a liquid into the freezing chamber and into direct contact with the articles causing the articles to cool and the cryogen to boil off into a cryogenic vapor having a density greater than air; and recovery means for compressing, liquefying and purifying the cryogenic vapor and for supplying the cryogen introducing means with liquid cryogen produced from the liquefaction of the cryogenic vapor, the improvement comprising:

exhaust means drawing the air from outside of the freezing chamber and the cryogenic vapor from inside of the freezing chamber into and then from the inlet and outlet plenums for preventing the air from entering the freezing chamber thereby, to prevent an increase in air concentration within the freezing chamber and such that the cryogenic vapor is drawn at an essentially constant, minimum flow rate;

the freezing chamber having an outlet;

outlet drawing means for drawing a combined flow of the cryogenic vapor and the air present within the freezing chamber through the outlet and to the recovery means at a combined flow rate;

the outlet spaced sufficiently below the top of the freezing chamber such that the air concentration of the combined flow is substantially minimized due to the density of the cryogenic vapor;

control means regulating the combined flow rate such that a total mass flow rate of the cryogenic vapor drawn through the inlet and outlet plenums and from the outlet is essentially equal to a liquid mass flow rate of the cryogen upon its entry into the freezing chamber for preventing production of over and under pressures within the freezing chamber that would expel cryogenic vapor through the inlet and outlet plenums above the essentially constant minimum flow rate and draw the air into the freezing chamber, respectively.

2. The improvement of claim 1, wherein:

the cryogenic freezer is a descending spiral belt freezer in which one of the inlet and outlet plenums is located above the other and a subatmospheric pressure exists within the freezing chamber at the one plenum; and the exhaust means draws the air and cryogenic vapor into and from the one plenum such that the one plenum is at a pressure less than the subatmospheric pressure and only a slight excess of cryogenic vapor escapes from the freezing chamber at the other plenum which is drawn therefrom at essentially atmospheric pressure.

3. The improvement of claim 2, wherein the exhaust means comprises:

a pair of conduits connecting the upper and lower plenums to an exhaust blower to draw the air and cryogenic vapor from the one and other plenums;

the pair of conduits having dampers to adjust the essentially constant flow rates of the air and cryogenic vapor at the one and other plenums so that the one plenum is at the subatmospheric pressure and the other plenum is essentially at the atmospheric pressure.

4. The improvement of claim 3, wherein:

the outlet drawing means comprises an outlet blower connected to the outlet of the freezing chamber; and the control means comprises, a pair of first and second flow sensing means connected to the cryogen introduction means and between the outlet blower and the recovery means, respectively, for generating flow signals referable to the liquid mass flow rate and the combined flow rate, and speed control means connected to the first and second flow sensing means, responsive to the flow signals, and deriving an outlet mass flow rate of the cryogenic vapor contained within the combined flow from the combined flow rate for controlling the speed of the blower such that the outlet mass flow rate is essentially equal to a product of the liquid mass flow rate and a constant.

5. The improvement of claim 4, wherein:

the freezing chamber has a temperature sensor; and the cryogen introduction means has, valve means for regulating the liquid mass flow rate of the cryogen entering the freezing chamber; and a valve control connected to the temperature sensor and the valve means and having registration means for registering a preset temperature for controlling the valve means to increase the liquid mass flow rate if the sensed temperature is greater than the preset temperature and to decrease the liquid mass flow rate if the sensed temperature is less than the preset temperature.

6. The improvement of claim 1, wherein:

the outlet drawing means comprises an outlet blower connected to the outlet of the freezing chamber; and the control means comprises, a pair of first and second flow sensing means connected to the cryogen introduction means and between the outlet blower and the recovery means, respectively, for generating flow signals referable to the liquid mass flow rate and the combined flow rate, and speed control means connected to the first and second flow sensing means, responsive to the flow signals, and deriving an outlet mass flow rate of the cryogenic vapor contained within the combined flow from the combined flow rate for controlling the speed of the blower such that the outlet mass flow rate is essentially equal to a product of the liquid mass flow rate and a constant.

7. The improvement of claim 1, wherein:
the freezing chamber has a temperature sensor; and
the cryogen introduction means has,
   valve means for regulating the liquid mass flow rate of the cryogen entering the freezing chamber; and
   a valve control connected to the temperature sensor and the valve means and having registration means for registering a preset temperature for controlling the valve means to increase the liquid mass flow rate if the sensed temperature is greater than the preset temperature and to decrease the liquid mass flow rate if the sensed temperature is less than the preset temperature.

8. In a method of cooling articles within a cryogenic freezer comprising: passing the articles into and from a freezing chamber within which the articles are cooled through inlet and outlet plenums connected to the freezing chamber; introducing a cryogen as a liquid into the freezing chamber and into direct contact with the articles such that the articles are frozen and the cryogen vaporizes into a cryogenic vapor having a density greater than air; and recovering the cryogen from the cryogenic vapor in a recovery unit by compressing, liquefying and purifying the cryogenic vapor and introducing the cryogen produced from the liquefaction of the cryogenic vapor into the freezing chamber to freeze the articles, the improvement comprising:
   preventing the air from entering the freezing chamber, thereby to prevent an increase in air concentration within the freezing chamber, by drawing air from outside of the freezing chamber and the cryogenic vapor from inside of the freezing chamber into, and then from, the inlet and outlet plenums and such that the cryogen vapor is drawn at an essentially constant minimum flow rate;
   drawing a combined flow of the cryogenic vapor and the air from the freezing chamber to the recovery unit at a combined flow rate and from an outlet of the freezing unit spaced sufficiently below the top thereof such that the air concentration within the combined flow, due to the density of the cryogenic vapor, is essentially at a minimum; and
   preventing production of over and under pressures within the freezing chamber that would expel the cryogenic vapor through the inlet and outlet plenums above the essentially constant minimum flow rate and draw the air into the freezing chamber, respectively, by controlling the combined flow rate such that a total mass flow rate of the cryogen vapor drawn through the inlet and outlet plenums and from the outlet is essentially equal to a liquid mass flow rate of the cryogen upon its entry into the freezing chamber.

9. The method of claim 8, wherein:
one of the inlet and outlet plenums is located above the other;
a subatmospheric pressure exists within the freezing chamber at the one plenum and an above atmospheric pressure exists within the freezing chamber at the other plenum; and
the air and cryogenic vapor are drawn from the one plenum such that a pressure exists in the one plenum less than the subatmospheric pressure and only a slight excess of cryogenic vapor escapes from the freezing chamber at the other plenum which is drawn therefrom at essentially the atmospheric pressure.

10. The improvement of claim 9, wherein the combined flow rate is regulated by:
   measuring the liquid mass flow rate of the cryogen upon its entry into the freezing chamber;
   measuring the combined flow rate and deriving an outlet mass flow rate of the cryogenic vapor drawn from the outlet of the freezing chamber; and
   regulating the combined flow rate such that the outlet mass flow rate is equal to a product of the liquid mass flow rate and a constant.

11. The method of claim 8, wherein the combined flow rate is regulated by:
   measuring the liquid mass flow rate of the cryogen upon its entry into the freezing chamber;
   measuring the combined flow rate and deriving an outlet mass flow rate of the cryogenic vapor drawn from the outlet of the freezing chamber; and
   regulating the combined flow rate such that the outlet mass flow rate is equal to a product of the liquid mass flow rate and a constant.

12. The improved method of claim 8, further comprising:
   sensing the temperature within the freezing chamber;
   comparing the temperature to a predetermined temperature for the freezing chamber; and
   regulating a liquid mass flow rate of the cryogen upon its entry into the freezing chamber by increasing and decreasing the liquid mass flow rate such that the temperature within the freezing chamber is equal to about the predetermined temperature.

13. The improved method of claim 8, further comprising:
   sensing the temperature within the freezing chamber;
   comparing the temperature to a predetermined temperature for the freezing chamber; and
   regulating the liquid mass flow rate of the cryogen upon its entry into the freezing chamber by increasing and decreasing the liquid mass flow rate such that the temperature within the freezing chamber is equal to about the predetermined temperature.

* * * * *